United States Patent [19]

Bruinsma

[11] 4,249,200
[45] Feb. 3, 1981

[54] COLOR SELECTION CIRCUIT FOR COLOR TELEVISION

[75] Inventor: Anne H. Bruinsma, Eindhoven, Netherlands

[73] Assignee: U.S. Philips Corporation, New York, N.Y.

[21] Appl. No.: 52,034

[22] Filed: Jun. 25, 1979

[30] Foreign Application Priority Data

Jul. 7, 1978 [NL] Netherlands .......................... 7807350

[51] Int. Cl.³ .......................................... H04N 9/535
[52] U.S. Cl. .................................................. 358/22
[58] Field of Search ................... 358/22, 21 R, 30, 37, 358/183

[56] References Cited

U.S. PATENT DOCUMENTS

| 3,560,638 | 2/1971 | Skrydstrup | 358/22 |
|---|---|---|---|
| 3,678,182 | 7/1972 | Boxman | 358/22 |
| 3,959,813 | 5/1976 | Legler | 358/22 |
| 4,051,520 | 9/1977 | Davidse | 358/22 |
| 4,183,045 | 1/1980 | Herrmann | 358/22 |

FOREIGN PATENT DOCUMENTS 2365256  4/1978  France ....................... 358/22

OTHER PUBLICATIONS

A Mixer-Keyer Amplifier for Color Television, Naitoh, et al., Jul. 1971, Journal of SMPTE, vol. 80, No. 7, pt. 1, pp. 545-551.
A Chroma-Key System Insensitive to Variations of Background Ill. Daidse, SMPTE Journal, Mar. 1977, vol. 86, p. 140-143.

Primary Examiner—Robert L. Griffin
Assistant Examiner—Michael A. Masinick
Attorney, Agent, or Firm—Thomas A. Briody; William J. Streeter; Edward W. Goodman

[57] ABSTRACT

A color selection circuit for color television, for example for chroma-keying signal generation. The signal generation is done independent of the luminance and depends only on the color with which a given combination of input signals corresponds. This is effected by the use of an equal-signal detection behind amplifier circuits to which input signals, having a predetermined peak-peak value are applied and at least two of these input signals have been set with a given attenuation factor with respect to a third, which setting determines the color at which the keying or switching signal is generated.

5 Claims, 2 Drawing Figures

COLOR SELECTION CIRCUIT FOR COLOR TELEVISION

BACKGROUND OF THE INVENTION

The invention relates to a colour selection circuit for colour television comprising several inputs and an output, the output carrying a switching signal if signals are present at the inputs in a predetermined combination which corresponds to a given colour.

Such a circuit is disclosed in U.S. Pat. No. 4,051,520. The colour selection circuit, known as a chroma-keying signal generator, does not operate with colour difference signals but rather with chromaticity signals. An advantage is that an improved signal separation is obtained when the keying, or switching, signal is produced when, instead of the luminance dependent colour difference signals, the luminance independent chromaticity signals are used. Due to the fact that generating the keying or switching signals is independent of the luminance, an intense, uniform background illumination without shadows thereon is no longer required. The requirements for the illumination and the construction of the more or less uniform background against which a scene is recorded are, namely, less critical.

SUMMARY OF THE INVENTION

It is an object of the invention to provide a colour selection circuit which generates a switching signal, produced at a given, colour, independent of the luminance. A circuit according to the invention is therefore characterized in that inputs of the colour selection circuit are connected to separate amplifier circuits, each comprising an adjustable amplifier and a signal clamping circuit, the amplifier circuits being connected to inputs of a detection circuit the output of which carries an output signal when the values of the inputs signals of the detection circuit are substantially equal to one another, the detection circuit output constituting the output of the colour selection circuit.

The invention is based on the recognition that luminance independent switching signal generation can be obtained by providing an equal-signal detection after the amplifier circuits to which input signals having a predetermined peak-peak value are applied, at least two of these signals having been set with a given attenuation factor with respect to a third input, which setting determines a colour at which the switching signal is generated.

The colour selection circuit can be used for producing the chroma-keying signal as it is performed in television studios or with a circuit with which, in a displayed scene having areas of a different colour, areas are given a different colour at choice, as described in U.S. Pat. No. 3,737,564.

An embodiment of the colour selection circuit with which a switching signal is produced if signal equality is detected within an adjustable percentage of the instantaneous value of the input signals, is characterized in that inputs of the detection circuit are connected to an input of another differential amplifier, input of which is connected to one of the other inputs of the detection circuit through a signal attenuator, the outputs of the differential amplifiers being connected to the output of the colour selection circuit through a coincidence gate.

A further embodiment wherein the colour selection circuit is put out of operation in the region of the black level is characterized in that an input of the detection circuit at which a combination signal formed from the signal at the other inputs is present, is connected to an input of a differential amplifier, another input of which is connected to an adjustable voltage source and the output is connected to the coincidence gate.

A simple implementation of a colour selection circuit is characterized in that inputs of the detection circuit are connected to the bases of different transistors, whose emitters are interconnected, the collector of each transistor being connected to a voltage-carrying terminal through another resistor and further coupled to the output of the detection circuit, each signal clamping circuit giving a signal clamping level at the input of the detection circuit connected thereto which level is shifted with respect to the voltage present on the emitter by least the base-emitter threshold voltage of the relevant transistor and with a polarity which blocks the transistor.

A further embodiment by means of which a switching signal having pulses of a given amplitude are produced is characterized in that in the detection circuit the collectors of the transistors are connected to the output of the colour selection circuit through a pulse shaper.

DESCRIPTION OF THE DRAWINGS

The invention will be explained by way of example with reference to the following figures in which.

DESCRIPTION OF THE PREFERRED EMBODIMENTS

Figure 1:
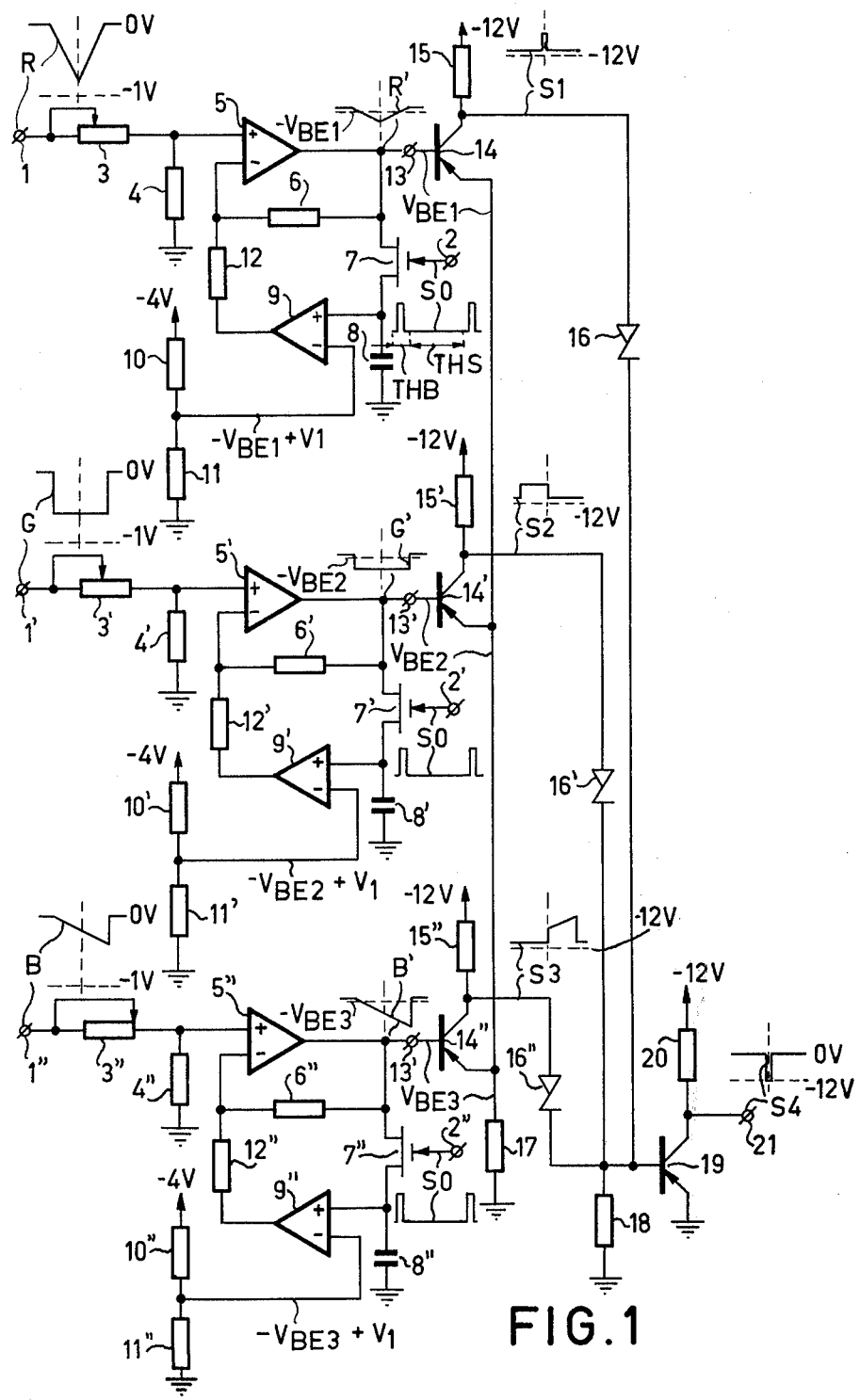
FIG. 1 shows a first embodiment of a colour selection circuit.

FIG. 1 shows a colour selection circuit provided with three inputs 1, 1' and 1" to which signals R, G and B respectively, are applied. The signals R, G and B are colour signals which are produced by a colour television camera and represent the red, green and blue, respectively, light components of a recorded scene. The signals R, G and B have a predetermined peak-peak value of, for example, $-1V$ and a predetermined black level which is clamped, for example, at 0V as the reference level. The peak value is indicated by $-1V$. In FIG. 1 the signals R, G and B are shown versus the time as well as a signal S0 of the same duration which is applied to inputs 2, 2' and 2". The signal S0 is a line clamping signal having rising pulses in line blanking periods THB. In the signal S0 at the input 2, THS and THB, respectively, denote a line scanning period and a line blanking period, which together form a line period.

Connected to the inputs 1, 1' and 1" are signal channels which comprise the same components so that the description of the signal channel connected to the input 1 also holds for the channels connected to the inputs 1' and 1". The input 1 is connected to a variable resistor 3 whose other lead is connected to ground through a resistor 4 and directly to the (+) input of a differential amplifier 5. The output of the amplifier 5 is connected to the (−) input thereof through a resistor 6 and to a drain of an insulated-gate electrode transistor 7. The gate electrode of the transistor 7 is connected to the input 2 and the source thereof is connected to ground through a capacitor 8 and directly to the (+) input of a differential amplifier 9. Under the control of the signal S0, the transistor 7 conducts in a portion of the line blanking periods THB and is cut-off in the further periods of time. The (−) input of the amplifier 9 is connected to the junction of two resistors 10 and 11, which are series-arranged between a terminal carrying a −4 V voltage and ground. The junction of the resistors 10 and 11 carries a voltage of, for example, $-V_{BE1}+V1$. The voltages $-V_{BE2}+V1$ and $-V_{BE3}+V1$, respectively, are denoted at the junction of the resistors 10' and 11', and 10" and 11", respectively. The output of the amplifier 9 is connected to the (−) input of the amplifier 5 through a resistor 12. An amplifier circuit (3—12) is thus formed, which comprises an adjustable amplifier (3—6) and a signal clamping circuit (7—12).

The outputs of the amplifiers 5, 5' and 5" are connected to the inputs 13, 13' and 13", respectively, of a detection circuit, still further to be described. The input 13 is connected to the base of a pnp transistor 14 whose collector is connected to a terminal, which carries a −12 V voltage, through a resistor 15 and is connected directly to the anode of a zener diode 16. The emitters of the transistors 14, 14' and 14" are interconnected and connected to ground through a resistor 17. The cathodes of the zener diodes 16, 16' and 16" are interconnected and connected to ground through a resistor 18 and directly to the base of a pnp transistor 19. The emitter of the transistor 19 is connected to ground and the collector is connected, through a resistor 20 to a terminal which carries a voltage of −12 V and directly to an output 21 of the colour selection circuit. A detection circuit (13—21) is thus formed, of which a pulse shaper (16—20) constitutes a part.

The following description explains the operation of the colour selection circuit (1—21) of FIG. 1. The signal shapes of the signals R, G and B, shown in FIG. 1, are the starting point. It is assumed that the colour selection circuit (1—21) must produce a switching signal S4 at the output 21 if the scene to be displayed comprises a colour wherein the signals R, G and B are present in the ratio 4:3:1. As the signal B is the smallest component in this ratio the resistor 3" is short-circuited, so that the amplifier (3—6) has its maximum gain factor which is, for example, equal to unity. In response thereto the signal B', shown in the drawing, occurs at the output of the differential amplifier 5". The signal clamping circuit (7"—12") ensures in known manner that the black level in the signal B' is clamped at the voltage $-V_{BE3}+V1$, applied to the (−) input of the differential amplifier 9". The voltage $-V_{BE3}$ is plotted in the signal B', the voltage $V_{BE3}$ being the base-emitter threshold voltage of the transistor 14". It is apparent that, when it is assumed that the ground potential equal to O V is present at the emitter of the transistor 14" this transistor is cut-off for voltage values in the signal B' located above the threshold $-V_{BE3}$ in other words the transistor 14" is cut-off near black level.

The voltage V1 determines the lowest signal value with respect to the black level, from which the transistor 14" might become conductive. Some 5 to 15% of the peak-peak value is mentioned by way of example.

As in the selected colour the values in the signals R and G are four and three times, respectively, higher than the values in the signal B, the resistors 3 and 3' are set thus that the amplifiers (3—6) and (3'—6') have a gain factor of ¼ and ⅓, respectively. As a result the output of the differential amplifier 5 and 5', respectively, carries the signal R' and G', respectively, shown next to it in the drawing. The base-emitter threshold voltages $V_{BE1}$ and $V_{BE2}$, respectively, of the transistors 14 and 14', respectively are denoted in the signal R' and G', respectively.

Starting from the signal R', G' and B', shown in FIG. 1 and present at the inputs 13, 13' and 13", respectively, of the detection circuit (13—21) the signals S1, S2 and S3 follow at the collectors of the transistors 14, 14' and 14". In the case the transistors 14, 14' and 14" are cut-off a small current flows through the resistors 15, 15' and 15" via the resistor 18 and the zener diodes 16, 16' and 16", respectively, so that a voltage value of nearly −12V is present in the signals S1, S2 and S3. If thereafter a voltage which is more negative than the base emitter threshold voltage $V_{BE}$ is present in one of the signals R, G and B, the associated transistor 14, 14' or 14" becomes conductive. Of these transistors 14, 14' or 14" that transistor will conduct at whose base the lowest voltage is present. It follows from the signals R', G' and B', shown in the drawing, that in the first half of the line scanning period THS the transistor 14' conducts and the transistor 14" in the second half. The situation in which the voltage values of the signals R', G' and B' are equal occurs halfway the line scanning period THS. Then, and only then, all three transistors 14, 14' and 14" conduct. The signals S1, S2 and S3 thus obtained are present at the base of the transistor 19 through the zener diodes 16, 16' and 16", respectively. Transistor 19 conducts and has then substantially the ground potential of 0 V at the collector whent the transistors 14, 14' and 14" do not all conduct or are cut-off. Only in the case that all transistors 14, 14' and 14" conduct, the voltage at the base of the transistor 19 becomes so little negative that the transistor 19 is blocked and the voltage of −12V then occurs in the signal S4. It appears that the signal S4, shown in the drawing, has a pulse only at the instant that an equal voltage value occurs in the signals R', G' and B'. The detection circuit (13—21) thus functions with equal-signal detection.

The switching signal S4 is produced by the pulse shaper (16—20) in the equal signal detection circuit (13—21) with pulses having a given amplitude (12 V) independent of the instantaneous, equal value in the signals R', G' and B'. For the signals R', G' and B' it follows that the value thereof does not affect the switching signal generation; there is only one sole requirement; the same value must be present in the signals R', G' and B'.

So signal generation is effected independent of the luminance, that is to say of the value of the input signals.

It holds as a general rule for the switching signal generation that for the smallest colour component in the combination of the signals R, G and B, resulting in a predetermined colour, the gain factor of the associated amplifier circuit must be set to the maximum value, the other gain factors must then be set inversely proportional to the number of times the other colour components are greater than the smallest component.

For a colour selection aimed at white wherein it holds for the colour white that R = G = B it follows that this selection is effected when the resistors 3, 3' and 3" are adjusted to the same value. For a selection of one of the basic colours red R, green G or blue B the gain factor for the selected colour should be minimal (associated resistor 3, 3' or 3" must be as large as possible) and at a maximum for the other colours (the other two resistors are short-circuited). In practice the basic colours do not occur in a pure form, also in the known "blue screen" technique percentages ranging from one-tenth to several tenths of percents of the colours red and green occur. Also then the resistors 3, 3' and 3" should be adjusted in the associated ratio.

The use of the signal clamping circuits (7—12), (7'—12') and (7"—12") has the advantage that on the one hand the disturbing influence on the equal-signal detection of, possibly, different base-emitter threshold voltages $V_{BE1}$, $V_{BE2}$ and $V_{BE3}$ is compensated for and that no switching signal generation is effected on the other hand by means of the voltage V1 at black (R = G = B = 0) and at low signal values.

Figure 2:
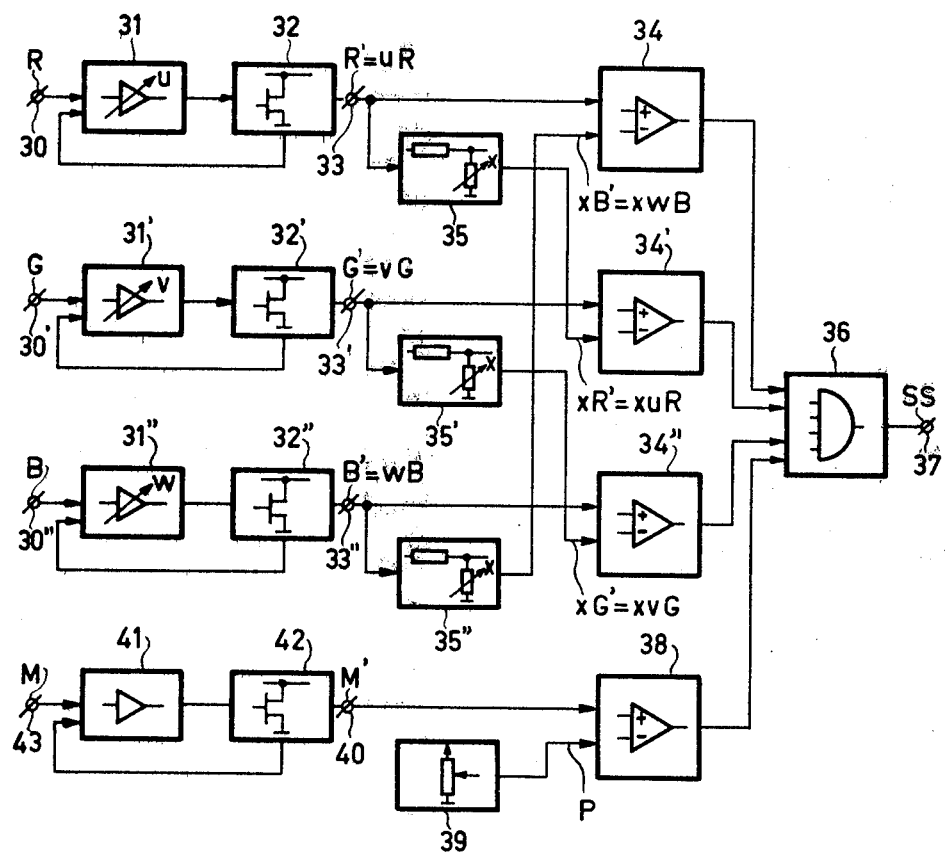
FIG. 2 shows a second embodiment.

FIG. 2 shows a colour selection circuit wherein switching signal generation is effected when signal equality is detected within an adjustable percentage of the instantaneous value of the input signals R, G and B. Reference numerals 30, 30' and 30" denote inputs of the colour selection circuit to which the signals R, G and B respectively, are applied. Amplifiers 31, 31' and 31", which have adjustable gain factors u, v and w are connected to the inputs 30, 30' and 30" wherein, for example u, v and w are equal to or smaller than unity. Signal clamping circuits 32, 32', and 32" which are fed back to a second input of the amplifiers 31, 31' and 31", respectively follow the amplifiers 31, 31' and 31". The amplifiers 31, 31' and 31" and the signal clamping circuits 32, 32' and 32" are provided in, for example, the manner shown in FIG. 1 with the amplifiers (3—6) and the signal clamping circuit (7—12). The amplifier circuits (31, 32) (31', 32') and (31", 32") are connected respectively to the inputs 33, 33' and 33" of a detection circuit still further to be described. The inputs 33, 33' and 33", which carry the signals R'=uR, G'=vG and B'=wB, respectively, are connected to the (+) inputs of differential amplifiers 34, 34' and 34" and to inputs of signal attenuators 35, 35' and 35" and which have an attenuation factor of x. The differential amplifier 34 has the (−) input connected to the output of the attenuator 35" which produces a signal xB'=xwB. The differential amplifier 34' has the (−) input connected to the output of the attenuator 35 which produces a signal xR'=xuB. The differential amplifier 34" has a (−) input connected to the output of the attenuator 35' which produces a signal xG'=xvG. The outputs of the differential amplifiers 34, 34' and 34" are connected to inputs of a coincidence gate 36, the output of which constitutes the output 37 of the selection circuit with a switching signal SS thereon. A further input of the gate 36 is connected to the output of a differential amplifier 38 whose (−) input is connected to the output which carries the voltage P of an adjustable voltage source 39 and the (+) input of which is connected to an input 40 of a detection circuit (33-40) thus formed. The input 40, which carries a signal M' is connected to the output of an amplifier circuit (41, 42) which comprises an amplifier 41 and a fed-back signal clamping circuit 42. An input of the amplifier 41 is connected to an input 43 of the colour selection circuit shown in FIG. 2 to which a signal M is applied. The signal M is a combination signal formed from the signal R, G and B, wherein it applies that, for example, M = 0.33R + 0.33G + 0.34B or M = 0.30R + 0.59G + 0.11B. Herein the signal M is a luminance signal which is not formed or is formed, respectively, in accordance with a television standard. The signal M' ensures that at signal values below the voltage P the gate, 36 is cut-off so that no switching signal generation is effected at low luminances.

The operation of the circuit according to FIG. 2 can be explained as follows. The differential amplifiers 34, 34' and 34" produce a positive signal when the voltage at the (+) input is greater than or equal to the voltage applied to the (−) input. Starting from a positive signal produced by the amplifier 38 it holds that the coincidence gate 36 supplies a positive-going pulse in the switching signal SS only when a positive signal occurs at all three inputs connected to the outputs of the amplifiers 34, 34' and 34". This can be expressed in the following formula:

$$R' \geq xB' \tag{1}$$

$$G' \geq xR'$$

$$B' \geq xG'$$

A further elaboration of (1) gives:

$$R' \geq xB' \geq x^2 G' \geq x^3 R' \tag{2}$$

$$G' \geq xR' \geq x^2 B' \geq x^3 G'$$

$$B' \geq xG' \geq x^2 R' \geq x^3 B'$$

The component with $x^3$ can be deleted as this relation is always valid for $x < 1$. A further elaboration of (2) gives:

$$uR \geq xwB \geq x^2 vG \tag{3}$$

$$vG \geq xuR \geq x^2 wB$$

$$wB \geq xuG \geq x^2 uR$$

To illustrate the influence of the factor x it is assumed that u=v=w so that it follows from (3) that $$R \geq xB \geq x^2 G \tag{4}$$

$$G \geq xR \geq x^2 B$$

$$B \geq xG \geq x^2 R$$

If it is now assumed that x = 0.975 then it follows that $x^2 = 0.95$. It is then apparent that the output signals of the three amplifiers 34, 34' and 34" are all three positive only if the signal R, G and B do not differ for more than 2.5% from one another as the most critical requirement is that:

$$R \geq 0.975B, \ G \geq 0.975R, \text{ and } B \geq 0.975G. \tag{5}$$

It follows that switching signal SS is only generated by means of the signal attenuators 35, 35' and 35" when signal equality within an adjustable percentage of the instantaneous value of the input signals R, G and B is detected. For simplicity of the example it has been assumed that the attenuation factors of the signal attenuators 35, 35' and 35" have been set with the same value x. This is, however, not necessary. By setting different values for the attenuation factors it can be achieved that the setting range for the three input signals is different.

The signal attenuators 35, 35' and 35" are, for example, provided with a resistor which is connectable through a change-over switch to one of a plurality of resistors of different values, whose other terminals are interconnected.

It should be noted that it is possible to provide only two signal channels with amplifiers circuits having adjustable gain factors when the signal having the smallest contribution in the colour combination is applied to the third signal channel with a predetermined gain factor. To this end the circuit can be provided with a change-over switch through which the signal having the smallest contribution is each time applied to the third signal channel.

What is claimed is:

1. A color selection circuit for color television having imputs and an output for providing a switching signal when signals are present at said inputs in a predetermined combination of values which corespond to a desired color, said color selection circuit comprising a plurality of amplifier circuits coupled respectively to said inputs, each of said amplifier circuits having an adjustable amplifier and a signal clamping circuit coupled thereto; and a detection circuit coupled to said plurality of amplifier circuits, whereby said detection circuit produces said switching signal when the signals from said amplifier circuits are substantially equal to one another.

2. A colour selection circuit as claimed in claim 1, characterized in that inputs of the detection circuit are connected respectively to the bases of different transistors whose emitters are interconnected, the collector of each transistor being connected to a voltage-carrying terminal through another resister and furthermore coupled to the output of the detection circuit, each signal clamping circuit giving a signal clamping level at the input of the detection circuit connected thereto which level is shifted with respect to the voltage present on the emitter by at least the base-emitter threshold voltage of the relevant transistor and with a polarity which blocks the transistors.

3. A colour selection circuit as claimed in claim 2, characterized in that in the detection circuit the collectors of the transistors are connected to the output of the colour selection circuit through a pulse shaper circuit.

4. A color selection circuit as claimed in claim 1, wherein said detection circuit includes a plurality of inputs and comprises a plurality of attenuators respectively coupled to said inputs; a plurality of differential amplifiers, each having a first input coupled directly to the respective input of the detection circuit and a second input coupled to one of said attenuators which is coupled to a different one of said inputs; and a coincidence gate coupled to the outputs of said differential amplifiers.

5. A color selection circuit as claimed in claim 4, which further comprises a further differential amplifier having a first and a second input and an output, an amplifier circuit coupled to said first input of said further differential amplifier, and an adjustable voltage source coupled to said second input of said further differential amplifier, said output of said further differential amplifier being coupled to said coincidence gate, whereby said further differential amplifier prevents said coincidence gate from conducting until a signal, which may comprise a combination of said other input signals, applied to said amplifier circuit, exceeds a predetermined level as established by said adjustable voltage source.

* * * * *